United States Patent
Neitemeier

(10) Patent No.: US 7,648,684 B2
(45) Date of Patent: Jan. 19, 2010

(54) PRE-CHAMBER REACTOR

(75) Inventor: Dieter Neitemeier, Steinhagen (DE)

(73) Assignee: Wedeco AG, Herford (DE)

( * ) Notice: Subject to any disclaimer, the term of this patent is extended or adjusted under 35 U.S.C. 154(b) by 782 days.

(21) Appl. No.: 11/211,224

(22) Filed: Aug. 25, 2005

(65) Prior Publication Data
US 2006/0110298 A1    May 25, 2006

(30) Foreign Application Priority Data
Nov. 25, 2004    (DE)    ................ 10 2004 057 076

(51) Int. Cl.
*B01J 19/08* (2006.01)
(52) U.S. Cl. .................. 422/186.3; 96/224; 250/438
(58) Field of Classification Search ............ 422/186.3; 96/224; 250/438
See application file for complete search history.

(56) References Cited

U.S. PATENT DOCUMENTS

| 4,296,066 A | | 10/1981 | Schenck |
| 6,099,799 A | * | 8/2000 | Anderson ............ 250/455.11 |
| 6,683,313 B2 | * | 1/2004 | Chen et al. ............ 250/455.11 |

* cited by examiner

*Primary Examiner*—Kishor Mayekar
(74) *Attorney, Agent, or Firm*—RatnerPrestia

(57) ABSTRACT

The invention relates to a device for disinfecting liquids by means of ultraviolet radiation in a continuous flow method, with a reactor chamber through which flow can take place and in which a number of UV radiator units is arranged, the reactor chamber being provided with a wall, which is open at two end sides, and locally surrounded by at least one pre-chamber. Advantageous flow conditions are achieved if the at least one pre-chamber is welded to the wall at a distance from the end side so that an annular intermediate space with an internal width (r) is formed between a side of the per-chamber and the wall, and an essentially axisymmetric annular gap (d) is formed between the end side and the pre-chamber.

7 Claims, 5 Drawing Sheets

US 7,648,684 B2

PRE-CHAMBER REACTOR

FIELD OF THE INVENTION

The invention relates to a reactor for disinfecting liquids by means of ultraviolet radiation in a continuous flow method.

BACKGROUND OF THE INVENTION

The disinfection of water by ultraviolet radiation has been know for decades. Ultraviolet radiation disinfects both effluent and drinking water by damaging the DNA of pathogenic microorganisms, which comprises their ability to multiply and consequently prevents infections.

Whereas effluent is conventionally irradiated in the context of water treatment plants in open tanks or unpressurised pipe systems, in the field of drinking water and for disinfecting media with reduced UV transparency it is conventional to use closed stainless steel channels with UV radiators arranged in them. The irradiation space in these channels is also referred to as a reactor.

For effective disinfection of pathogenic germs in drinking water, it is necessary for every microorganism contained in the water to receive a particular minimum dose of ultraviolet radiation. The dose is equal to the irradiation intensity multiplied by the irradiation time. Conventional reactors have an inlet and an outlet, which are arranged at the ends of the reactor in the flow direction and are aligned in a radial direction. They feel the medium directly into the irradiation space. The medium to be irradiated is guided through the reactor either in an approximately U-shaped or Z-shaped direction, depending on the alignment of the connections. With this arrangement, it has been found that preferred flow paths are formed. In these flow paths, the water with the microorganisms contained in its is delivered particularly rapidly through the reactor. The speed in this region entails a short residence time, which necessitates a relatively high radiation intensity for a good disinfection result. Other flow paths, in which the flow rate is lower, receive a substantially higher radiation dose than is actually necessary, owing to the rather homogeneous radiation distribution inside the reactor. The radiation is therefore not utilized optimally.

U.S. Pat. No. 4,296,066 discloses a reactor in which a single UV radiator is surrounded by a coaxial glass tube and, further outwards, by a coaxial influx chamber. The water to be irradiated firstly enters the influx chamber and passes externally around the glass tube into an open end. In this way, the microorganisms in the flowing water received a first radiation dose which passes through the coaxial inner tube. The flow then enters the inner tube at an open end, and passes through between the inner tube and the radiator, before emerging at the other end of the inner tube. On the second sub-path between the radiator and the coaxial inner tube, the microorganisms contained in the water received a second, significantly higher radiation dose. The total dose which is relevant to the disinfection in the sum of the two doses, i.e. the first dose received in the outer space and the dose subsequently received in the inner space. Owing to the coaxial arrangement of the inner tube and the radiator and the relatively narrow annular gap between these two components, it is not likely that zones with a particularly low flow rate will form. The reactor according to U.S. Pat. No. 4,296,066, however, is elaborately designed and suitable only for a single UV radiator.

SUMMARY OF THE INVENTION

The present invention relates to a reactor for disinfecting liquids by means of ultraviolet radiation in a continuous flow method. A reactor chamber is formed by a UV opaque wall formed with an open inlet end and an open outlet end. At least one UV radiation unit is included within the chamber. One end of the chamber is surrounded by a pre-chamber that is connected to the outer surface of the opaque wall at a distance from the open end of the opaque wall to form an annular space between the pre-chamber and the adjacent outer surface of the opaque wall and to form a gap between the end of the circumferential space and the pre-chamber.

Because the at least one pre-chamber is connected, e.g., welded to the outer surface of the opaque wall at a distance from its open end, so an annular intermediate space with an internal width is formed between a side of the pre-chamber and the wall, and because the annular gap formed between the end side and the pre-chamber is essentially axisymmetric, a flow rate profile of the flow in the reactor chamber is set up which is homogenous and formed without pronouncedly rapid flow paths.

If the reactor is made of a material which is not UV-transparent, preferably stainless steel, the structure is particularly simple and durable. It is also feasible to make the reactor from polyethylene.

For particularly good flow conditions, a first pre-chamber may be arranged upstream of the reactor chamber and a second pre-chamber may be arranged downstream of the reactor chamber. It is then preferable for the first pre-chamber and the second pre-chamber to have essentially equal dimensions.

It is in this case sufficient for each of the pre-chambers to cover the reactor chamber to about 20% of the lengthwise extent of the reactor chamber.

The flow conditions are further improved if the internal width of the annular intermediate space in the radial direction between the pre-chamber and the reactor chamber is about 1.5 times as large as the distance from the end side of the pre-chamber (the gap) to the end side of the reactor chamber.

The present invention will be described below with reference to exemplary embodiments.

DETAILED DESCRIPTION OF THE INVENTION

Figure 1:
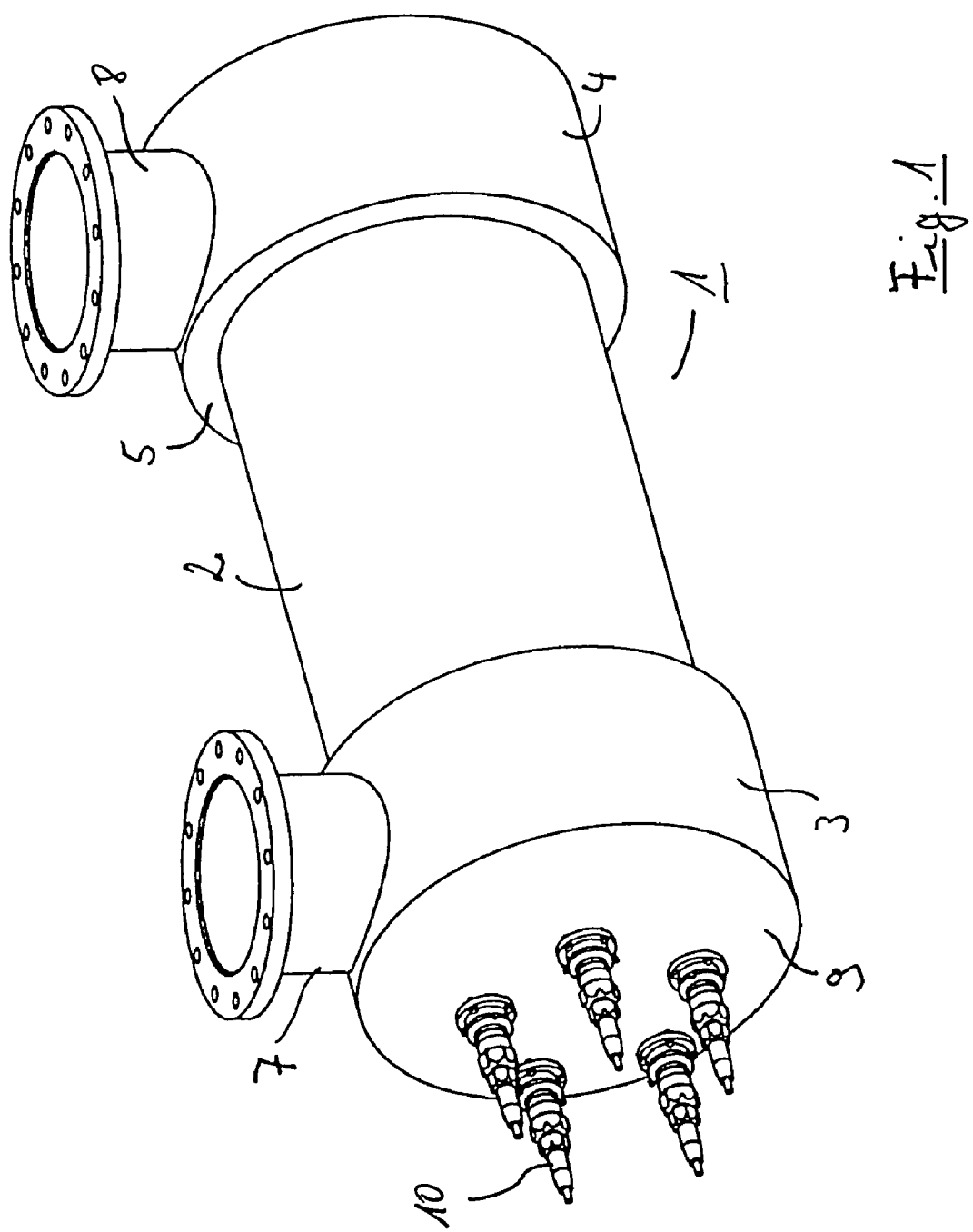
FIG. 1 shows a reactor according to the invention in a perspective representation.

FIG. 1 illustrates a reactor 1 in a perspective representation, here as an exemplary embodiment of the irradiation of drinking water with ultraviolet radiation. The reactor 1 ha a cylindrical tubular reactor chamber 2, which respectively carries a first pre-chamber 3 and a second pre-chamber 4 at its two ends. The pre-chambers 3 and 4 are designed in the manner of a dished bottom, and they are arranged coaxially with the reactor chamber 2. An annular connecting element 5 respectively connects the pre-chambers 3 and 4 to the reactor chamber 2 in a water- and gas-tight fashion. Between the pre-chambers 3, 5 and the wall of the reactor chamber 2, an annular intermediate space with the internal width r is formed. On their upper side, the pre-chambers 3 and 4 respectively carry a round flange 7, 8 for connection to a water pipe installation. On its end side facing away from the reactor chamber 2, the pre-chamber 3 carries a bulging dished bottom 9. This dished bottom 9 is penetrated by a total of five openings, in which five UV radiator arrangements 10 are fitted in a water-tight fashion. The radiator arrangements 10 extend into the reactor chamber 2, parallel with its symmetry access.

Figure 2:
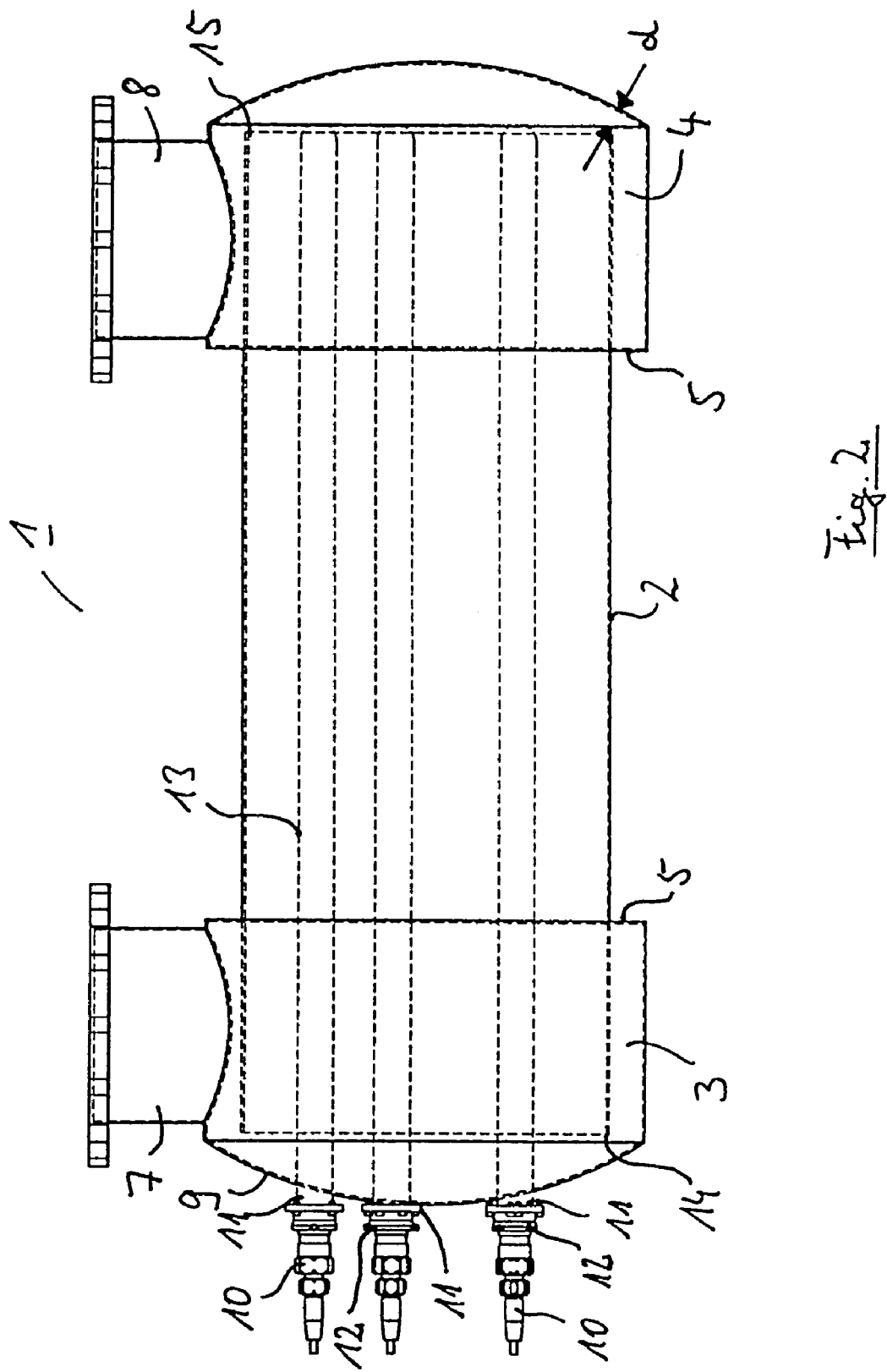
FIG. 2 shows the reactor according to FIG. 1 in a side view.

This is illustrated in more detail in FIG. 2.

The dished bottom 9 carries a total of five flanges 11, which lead into the interior of the pre-chamber 3. Terminal elements 12 for the radiator arrangements 10 are fitted onto the flanges 11, so that the radiator arrangements 10 can be fastened water-tightly. The radiator arrangements 10 respectively have an envelope tube 13 of quartz glass or another UV-transparent material. The envelope tube 13 extends axially parallel through the entire reactor chamber 2. The reactor chamber 2 protrudes into each of the pre-chambers 3 and 4 far enough to cover the extent of the flanges 7 and 8 in the axial direction of the reactor chamber 2. A distance r is in this case provided between the flanges 7 and 8 and the reactor chamber 2, which corresponds approximately to the width of the connecting elements 5 in this direction, i.e. approximately the difference between the radii R of the reactor chamber 2 on the one hand, and the pre-chambers 3 and 4 on the other hand. A distance d is furthermore provided between each end face 14, 15 of the reactor chamber 2 and the respectively neighbouring dished bottom of the pre-chambers 3 and 4, respectively, which allows annular gap-shaped access from the flange 7, 8 through the pre-chamber 3, 4 into the reactor chamber 2.

Figure 3:
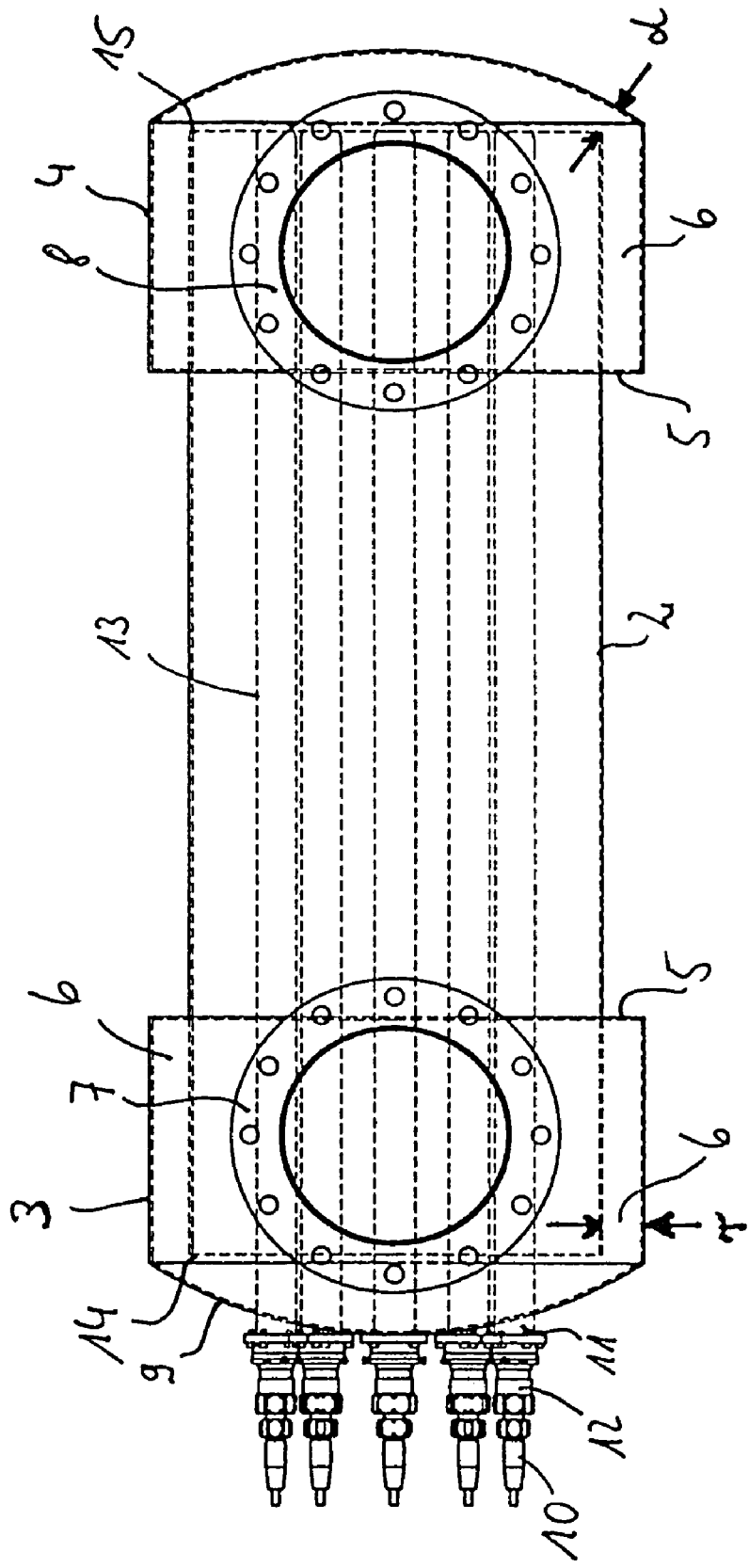
FIG. 3 shows the reactor according to FIG. 1 and FIG. 2 in a plan view.

FIG. 3 shows the reactor described so far in a plan view. Components which are the same are provided with the same references. In this representation, the distance d between the end side 15 of the reactor chamber and the dished bottom of the pre-chamber 4 is again illustrated. The annular gap between the outer side surface of the pre-chamber 3 and the reactor chamber 2 is furthermore denoted by r.

Figure 4:
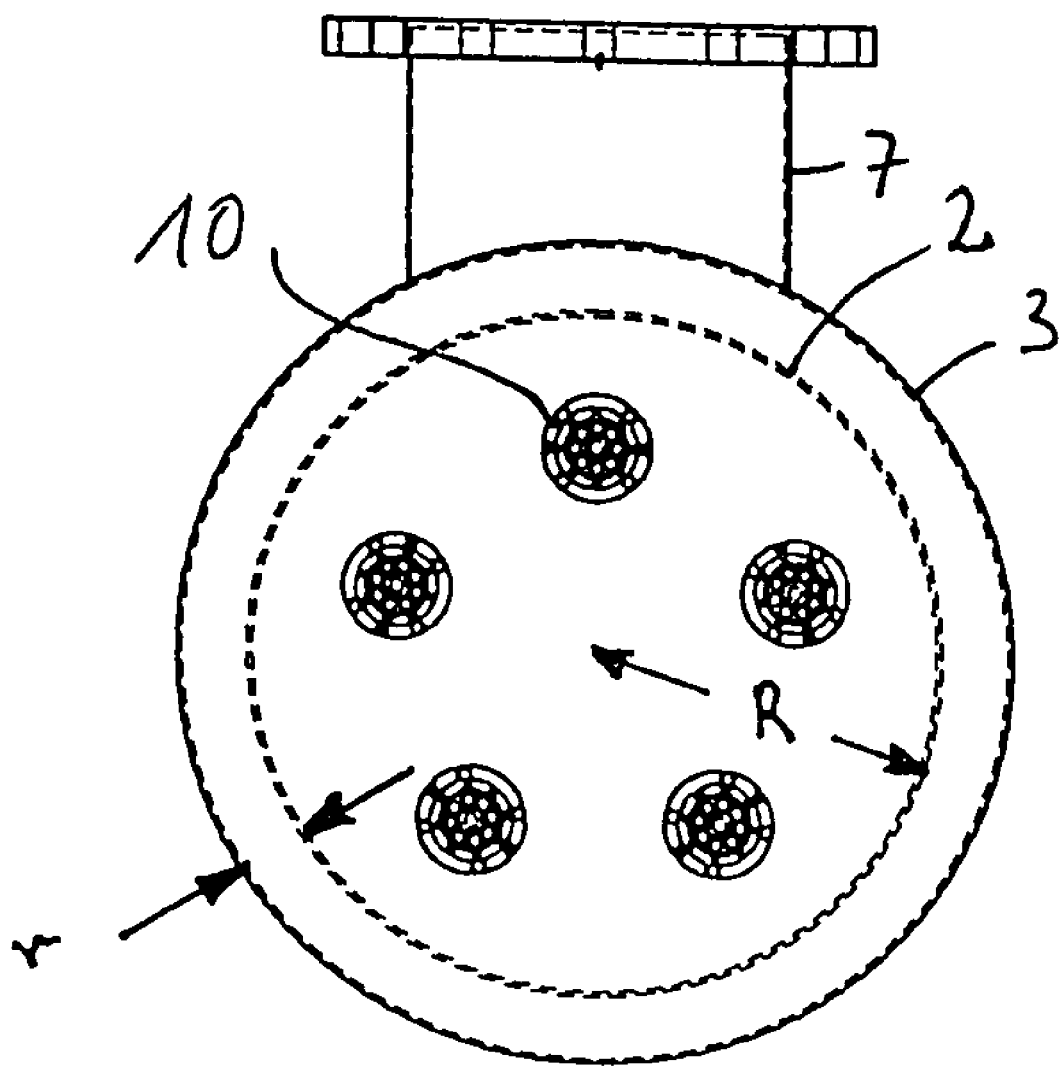
FIG. 4 shows the reactor in an end view.

Lastly, FIG. 4 shows the reactor described so far in a side view. It can be seen that the radiator units 10, of which five units are provided in this case, are distributed symmetrically around the mid-axis of the reactor chamber 2.

Figure 5:
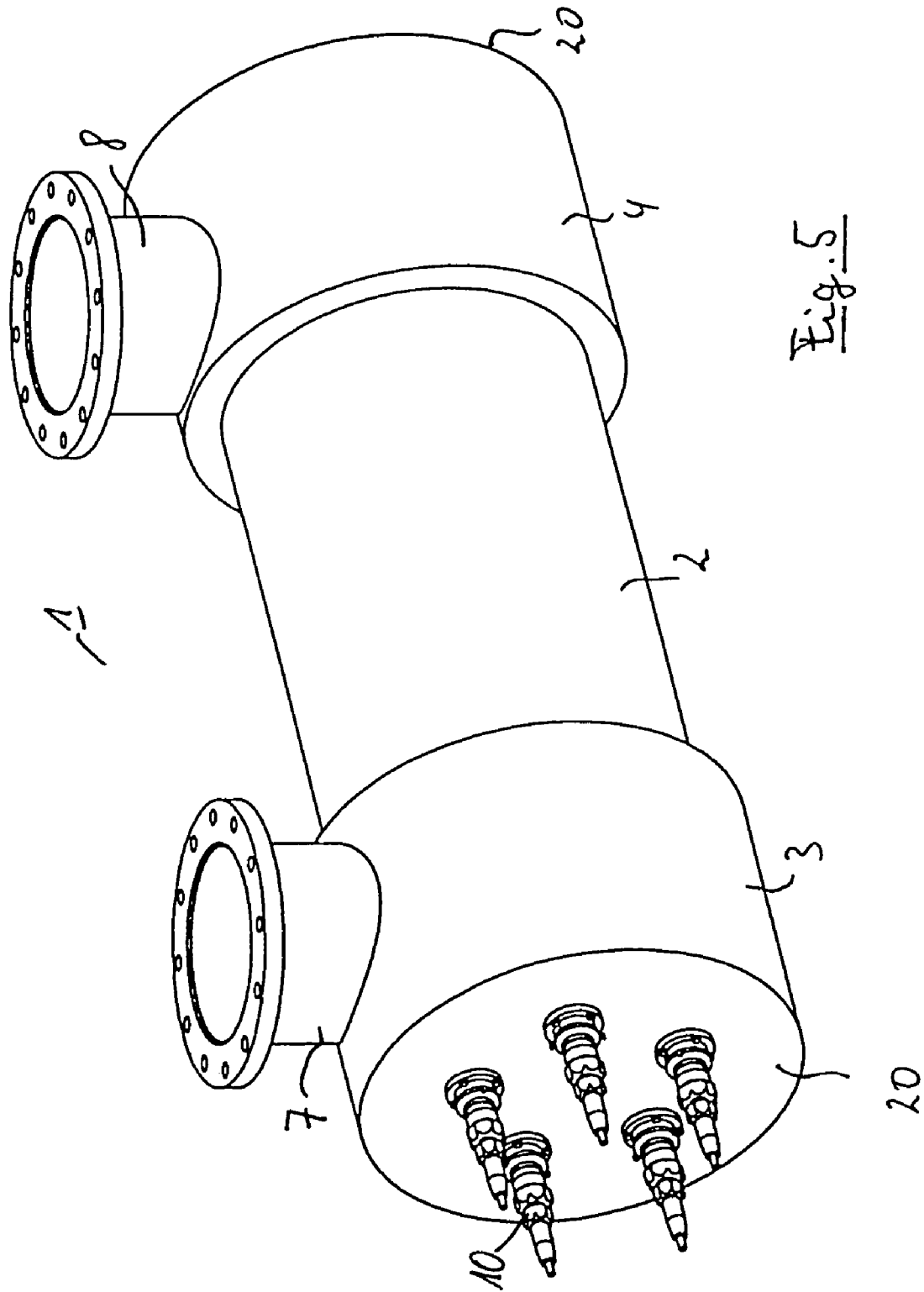
FIG. 5 shows a reactor with a differently configured pre-chamber in a representation corresponding to FIG. 1.

FIG. 5 shows another embodiment of a pre-chamber reactor according to the invention in a representation corresponding to FIG. 1. In this embodiment, the end-side bottoms of the pre-chambers 3 and 4 are not domed but flat. As regards the rest of the design features, the comments relating to FIG. 1 apply.

In practice, the UV reactor is used to disinfect drinking water. To this end, the supply of the microbiologically untreated drinking water is connected to the flange 7, whereas the discharge after disinfection is connected to the flange 8. The ate then flows from the flange 7 into the pre-chamber 3, specifically into its annular space with the width r between the side surface of the pre-chamber 3 and the outer wall of the reactor chamber 2. Entry from the pre-chamber 3 into the reactor chamber 2 takes place through the annular gap between the end side 14 of the rector chamber 2 and the dished bottom 9. Since the distance d here is less than the width r between the pre-chamber 3 and the reactor chamber 2, the flow through the annular gap is distributed almost uniformly along the entire circumference. The influx into the reactor chamber 2 is therefore approximately distributed uniformly about the mid-axis of the reactor chamber 2. A virtually homogeneous flow distribution is obtained inside the reactor chamber 2, parallel to the envelope tubes 13 of the radiator units 10, pronounced velocity maxima do not occur. The UV radiation which is emitted by the radiator units 10 therefore acts essentially with an equal radiation dose on all of the microorganisms contained in the flowing liquid. With this arrangement, it is not necessary to maintain a particularly high intensity so that the microorganisms in isolated flow paths with a flow rate far above the average can also be irradiated sufficiently. The energy efficiency for this UV reactor is therefore significantly better than that of conventional UV reactors.

After the drinking water has been irradiated inside the reactor chamber 2, it again passes through an annular gap between the end side 15 and the per-chamber 4, into the annular space between the reactor chamber 2 and the pre-chamber 4, and then leaves the UV reactor 1 through the flange 8.

Owing to the materials used (stainless steel) and the free arrangement of the radiator units 10 inside the reactor chamber 2, the described UV reactor can be scaled virtually arbitrarily.

In the exemplary embodiment described, the following dimensions are advantageous for achieving a uniform through-flow:

The inner radius R of the reactor chamber 2 is 280 mm.

The annular gap r (intermediate space 6) between the pre-chamber 3 and the outside of the reactor chamber 2 is approximately 30 mm.

The gap d is 20 mm between the end side 14 and the dished bottom 9, and between the end side 15 and the dished bottom 9 of the pre-chamber 4.

The diameter of the envelope tube 13 of the radiator units 10 is respectively 50 mm.

The invention claimed is:

1. A device for disinfecting liquids, the device comprising a generally tubular member formed by a wall of UV opaque material defining a reactor chamber, the opaque wall having an annular end surface at each end, a UV radiation unit in the reactor chamber, a pre-chamber adjacent one end surface, the pre-chamber including a bottom wall having an interior surface axially spaced from its adjacent end surface, the bottom wall having an axially extending connecting element connected to the outer surface of the opaque wall inwardly of its adjacent end surface to form an annular space there between, the connection between the bottom surface and the axially extending connecting element being located outwardly of its adjacent end surface to form an annular gap, the connecting element communicating with a fluid opening located inwardly of its adjacent end surface whereby the annular space, the annular gap and pre-chamber form a flow path between the fluid opening and the reactor chamber, the flow path being configured to provide a uniform distribution of liquid inside the reactor chamber.

2. A device in accordance with claim 1, wherein the interior surface is concave.

3. A device in accordance with claim 2, wherein the annular space has a dimension that is larger than the smallest distance of the gap between the annular end surface and the bottom surface.

4. A device in accordance with claim 1, wherein the connecting member covers about 20% of the axial extent of the outer wall of the reactor chamber.

5. A device in accordance with claim 1, wherein the annular gap has a dimension about 1.5 times larger than the smallest gap between the bottom wall and the one end surface.

6. A device in accordance with claim 1 wherein the bottom wall is dish shaped.

7. A device in accordance with claim 1 wherein the device includes another pre-chamber at the open outlet end of the reactor chamber which another pre-chamber is the same as the pre-chamber at the open inlet end.

* * * * *